No. 79,124. J. F. HOLLISTER. GLOBE JOINT. PATENTED JUNE 23, 1868.
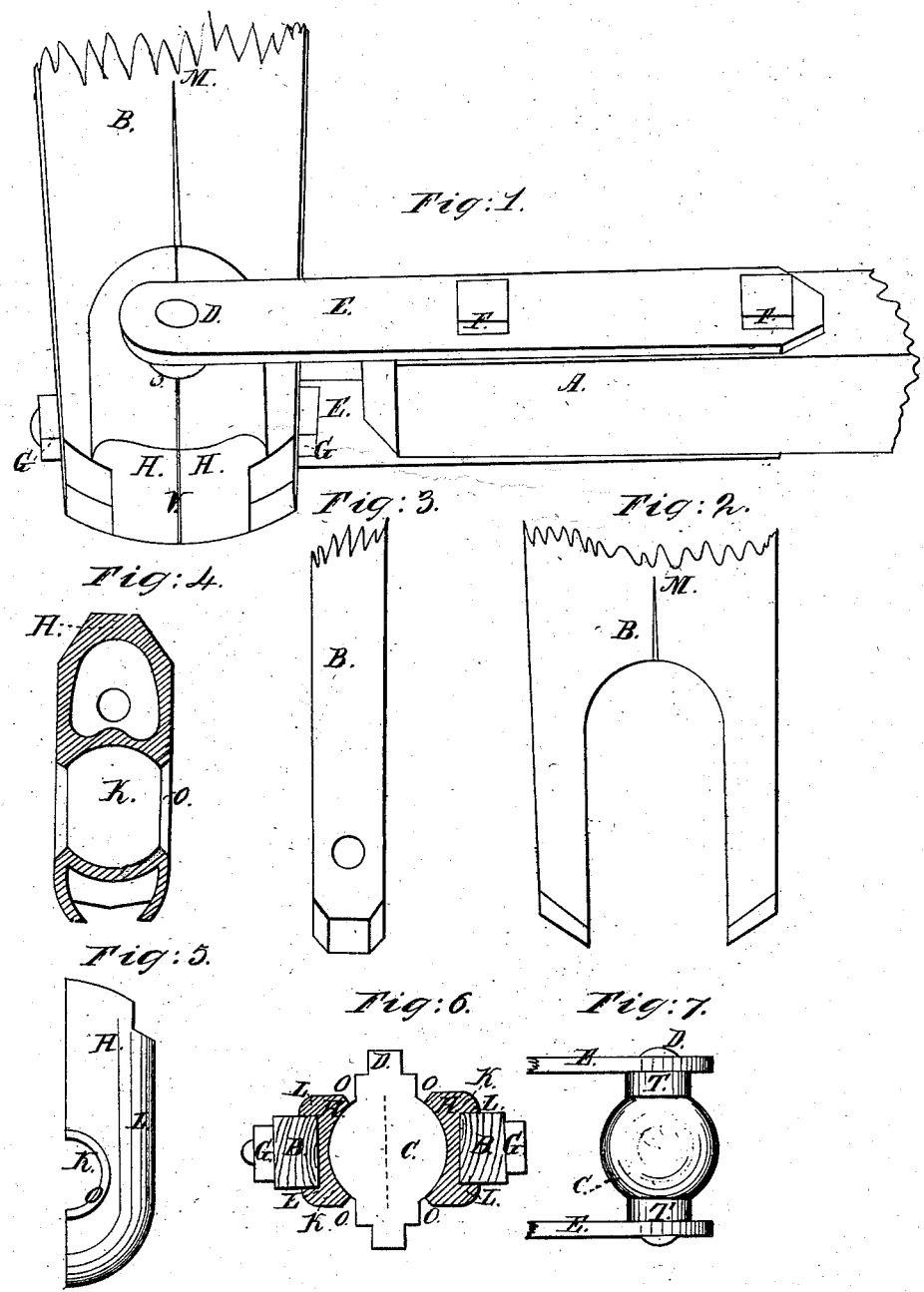

UNITED STATES PATENT OFFICE.

J. F. HOLLISTER, OF PLANO, ILLINOIS.

IMPROVEMENT IN GLOBE-JOINT.

Specification forming part of Letters Patent No. 79,124, dated June 23, 1868.

*To all whom it may concern:*

Be it known that I, J. F. HOLLISTER, of Plano, in the county of Kendall and State of Illinois, have invented a new and useful Improvement in Globe or Universal Joints for Reapers, Mowers, and other Machinery; and I do hereby declare that the following is a full, clear, and exact description of the construction and operation of the same, reference being had to the annexed drawings making a part of this specification, in which—

Figure 1 shows a perspective view of the joint in its working position; Fig. 2, a top view of a portion of the vibrating bar bared of its appendages; Fig. 3, edge view of same portion; Fig. 4, inside or facial view of one of the halves of the box, the same being duplicated in its counterpart; Fig. 5, a top view of same half; Fig. 6, a vertical section of the joint; Fig. 7, the globe, with a portion of the pitman-straps fastened upon its shanks or polar pins.

Parts lettered as follows: A, portion of connecting rod or pitman; B, portion of vibrating bar, to remote end of which the sickle is attached, or other connection made; C, globe; D, shanks of globe; E, pitman-straps; F, bolts in pitman; G, box-bolt; H, box; K, concaves in the box to receive the globes; L, lips or flanges on the back or outer corners of the box; M, contracting fissure in the bar; O, eye of the box; T, boss or shaft of the globe; V, crevice or cleft of box.

Manner of Constructing My Joint.

I form the equatorial portion of a sphere with an area covering, say, one hundred degrees of its latitudes, leaving a boss and shank at each pole, as seen at T and D, Figs. 6 and 7. Onto these two shanks I put one end of the pitman-straps E, and fasten it there firmly by riveting or otherwise. The other ends of said straps are then placed upon the pitman A, and secured there by the bolts F, or their equivalent. Thus the axis of the globe is made at a right angle with the line of pitman movement. I now construct a box in two parts or halves, (shown in Figs. 4 and 5,) Fig. 4 being a facial view, and Fig. 5 a top view of the same. Into these faces the concaves K, Figs. 4 and 5, (seen better in Fig. 6,) are sunken, and made to fadge nicely upon the globe when the work is put together. The eyes of the box are pared away about the bosses (see O O O O, Fig. 6) far enough to allow the globe to swing freely in every direction to accommodate itself to all of the different motions involved in its relations. On the outer corners of the box are lips to bind the prongs of the bar B, as shown at L L L L, Fig. 6. These lips serve the double purpose of steadying the box securely in its place, and insuring the ends of the prongs against splitting.

The cavities about the bolt-holes in the inner faces of these boxes are made to lighten the work, and also to lessen the contiguous surfaces, so they may be the more easily ground or filed off for tightening the joint, should it become loose by wearing.

In the end of the bar B a large opening is made, to be filled by the box. Beyond this, along the center of the bar, a fissure, M, is made far enough to permit the bolt G to draw the prongs and box together, and bring the joint to the desired tightness.

To put the joint together, the box is first put upon the globe and all inserted together in its place in the opening in the bar B, and secured there by the bolt G. This plan of adaptation is particularly convenient where a vibrating-bar intervenes between the pitman and the sickle; but if such bar or its equivalent be not used, but the pitman made to drive the sickle direct, the box is modified only in its outward form, however, to suit the place and manner of movement.

The surfaces which work upon the globe must in no case be misplaced, but must still be made to cover the same meridians on the globe, and the crevice-plane of the box still be maintained at the required right angle to the power-line.

In some cases it is desirable to use but one of the straps E, thus dispensing with one strap and its relative boss and shank, in which case the one strap needs to be much heavier. In some cases, even the globe is fixed to the sickle, and the box to the pitman. In every case, the box, whatever may be its outward form, must be made in such relation with the globe that the center line of pitman movement shall fall at or near a perpendicular to the plane of the crevice of said box. (See V, Fig. 1, and dotted line on globe-section, Fig. 6.)

By placing the axis of the globe on the aforesaid angle, holding it there by one pole or both, two equal and opposite cheeks are presented to their alternate labors; and, by adjusting the box as above described, two unbroken, equal, and opposite concaves are present to meet them. Thus under any and all modifications of outward form of box, all the essential characteristics of the joint sought to be secured by Letters Patent are preserved.

In adapting the crank to agricultural machinery, the circumstances and conditions which interfere with the right and simple adaptations of the same are so numerous and perplexing, that it becomes at times expedient to turn the line of such crank-action from its right one to any oblique direction within the bounds of practicability. Instance, if a pitman on a horizontal shaft be connected with a vibrating bar on a vertical shaft, there will be, at the point of connection, two distinct movements combined, and one across the other, requiring two joints or their equivalent, to work well. Again, when the pitman and the sickle are connected direct, unless the sickle-line is on the same plane with the crank-pin circle, and the sickle plane on the same or a parallel plane with the crank-shaft—and a very few of either reapers or mowers are made in harmony with these right conditions—the like oblique and compound movements are involved, and they cannot run well without two joints or their equivalent. My joint is that equivalent—the desideratum sought—embodying within itself enough of the scope and efficiency of universal sweep to meet all such practical needs; and herein lie the demand for, and use of, such a joint.

In my method of constructing this joint I secure four most important ends, viz., cheapness, lightness, strength, and durability. The globes are made of wrought iron or steel, and swaged into shape; or of cast-iron or cast-steel, or other metal, and cast into shape; or of wrought and cast combined, as with small rods or pins laid into the molds, and metal cast about them. This last device is convenient if the straps are to be fastened on by riveting. The boxes are made of any of the metals most suitable, and with even greater facility than the globes. The pitman-straps are of any suitable material, wrought or cast. If wrought, they are cut off and punched cold, so that lathe-work, or smithing, or even chipping is scarcely required upon any part of the joint.

Of the globe-joints heretofore in use—for instance, the compass-staff and the pump-plunger—the latter has one full cheek in the line of its work, while the shank or stem of its connecting-rod is where the other cheek, its opposite, should be, which very seriously damages the joint for alternating labor. Again, there is a modern improvement applied to some mowers, with globe as above, and this globe grasped in a box cleft on the plane of the pitman-line. This plan is worse than the one above named, for this not only destroys the efficient portion of the cheek in question, but the remaining fraction, in its labor to operate the machine, is driven as a wedge into the crevice of the box.

The above I disclaim.

Claims.

What I claim as my invention, and desire to secure by Letters Patent, is—

1. The mode of connecting the globe C, by means of straps on its poles, or their equivalent, substantially as set forth.

2. The concaves K K and vibrating bar B, combined with the globe C and pitman A, the whole constructed and operating substantially as described.

3. Also, the lips L L L L, for the purposes set forth.

4. Also, the fissure M in bar B, for the purpose set forth.

J. F. HOLLISTER.

Witnesses:
A. STEWARD,
A. N. BEEBE.